United States Patent
Wong et al.

(10) Patent No.: US 7,117,009 B2
(45) Date of Patent: Oct. 3, 2006

(54) APPARATUS AND METHOD FOR ELECTRONIC DEVICE CONTROL

(75) Inventors: Daniel Wong, Wildwood, IL (US); Keith Kinerk, Fontana, WI (US)

(73) Assignee: Motorola, Inc., Schaumburg, IL (US)

( * ) Notice: Subject to any disclaimer, the term of this patent is extended or adjusted under 35 U.S.C. 154(b) by 236 days.

(21) Appl. No.: 10/324,437

(22) Filed: Dec. 20, 2002

(65) Prior Publication Data

US 2004/0204059 A1 Oct. 14, 2004

(51) Int. Cl.
*H04Q 7/32* (2006.01)

(52) U.S. Cl. ............... 455/556.1; 455/566; 455/575.3; 455/575.1; 455/550.1; 455/90.3; 455/556.2; 379/433.11; 379/433.13; 379/433.01; 345/158; 345/156; 345/166; 345/169; 345/214

(58) Field of Classification Search ............ 455/556.1, 455/556.2, 575.3, 575.1, 550.1, 517, 90.3, 455/557, 344, 500, 422.1, 403, 425, 566; 379/433.11, 433.13, 433.01, 428.08; 345/55, 345/158, 156, 166, 169, 214

See application file for complete search history.

(56) References Cited

U.S. PATENT DOCUMENTS 6,549,789 B1 * 4/2003 Kfoury .................... 455/550.1
2002/0102946 A1 * 8/2002 SanGiovanni ................ 455/90
2003/0013483 A1 * 1/2003 Ausems et al. ............. 455/556
2003/0045245 A1 * 3/2003 Hikishima .................... 455/90
2003/0064758 A1 * 4/2003 Mizuta et al. .............. 455/566
2004/0077386 A1 * 4/2004 Nagasawa ................ 455/575.1
2004/0080468 A1 * 4/2004 Wakefield ..................... 345/55

* cited by examiner

*Primary Examiner*—Keith Ferguson
(74) *Attorney, Agent, or Firm*—Matthew C. Loppnow

(57) ABSTRACT

An apparatus and method for electronic device control. The apparatus can include a first housing including a first housing face, a display coupled to the first housing face, a second housing pivotably attached to the first housing the second housing including a second housing face, the second housing face being configured to cover at least a portion of the first housing face. The apparatus can also include a housing orientation detection module coupled to the second housing, the housing orientation detection module configured to detect a position of the second housing relative to the first housing. The apparatus can additionally include a controller configured to display motion on the display based on the position detected by the housing orientation detection module. The second housing can be pivotably attached to the first housing along at least two axes of rotation.

21 Claims, 8 Drawing Sheets

APPARATUS AND METHOD FOR ELECTRONIC DEVICE CONTROL

CROSS-REFERENCE TO RELATED APPLICATIONS

This application is related to an application 10/326,516 entitled "Apparatus and Method for Application Control in an Electronic Device," which is hereby incorporated by reference, filed on even date herewith, and commonly assigned to the assignee of the present application.

BACKGROUND OF THE INVENTION

1. Field of Invention

The present invention is directed to a method and apparatus for electronic device control. In particular, the present invention is directed to input-devices for movement control in an electronic device.

2. Description of Related Art

Presently, many different applications are being incorporated into small electronic devices. For example, mobile communication devices are incorporating gaming applications and personal digital assistants are incorporating communication applications. When a mobile communication device employs a gaming application, the game must use the existing input devices on the mobile communication device. For example, an existing telecommunications keypad, an existing navigational input, and other preexisting communication inputs must be used for gaming control on a mobile communication device. As another example, an extra external device may be attached to a mobile communication device to provide additional input functionality. Unfortunately, extra external devices reduce the convenience and portability of a mobile communication device. In particular, it is desirable to integrate all necessary features exclusively into the mobile communication device.

Unfortunately, the small size of some electronic devices limits the available inputs for multiple applications. As mentioned, the controls for a game on a mobile communication device are limited to the limited number of existing inputs such as keys and buttons. These inputs are not placed in optimal positions for efficient gaming or navigation control. Furthermore, to conserve space, these inputs are small and congested due to the small size of many electronic devices. Thus, optimal use of the inputs is difficult due to their size and location.

Additionally, many advanced gaming applications require precise control and simultaneous input of multiple navigation controls along with action controls. Unfortunately, it is impossible to configure existing gaming system games for compact portable electronic devices because of the specific input requirements. For example, many existing gaming systems use joysticks that cannot be incorporated into mobile communication devices without sacrificing size and aesthetics. As another example, it is uncomfortable to play games that require the use of navigation and action inputs on mobile phones because these games require the use of two hands to play the games. The existing small mobile phone keypad is uncomfortable and non-intuitive for such games.

Thus, there is a need for an electronic device with improved tactile input functionality. Additionally, there is a need for input devices for improved movement control in a small electronic device. Furthermore, there is a need for advanced input functionality for advanced gaming on portable electronic devices.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
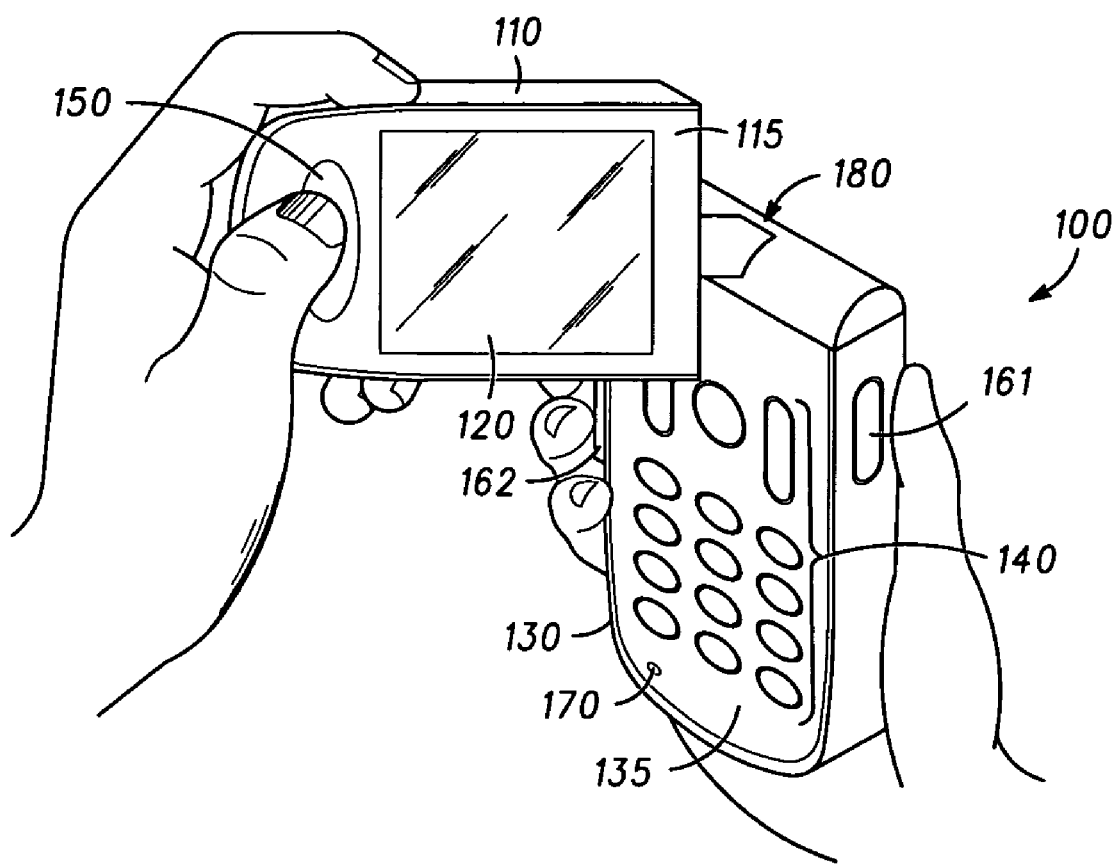
FIG. 1 is an exemplary illustration of an electronic device according to a first embodiment.

The invention provides an apparatus and method for electronic device control. According to one embodiment, the present invention provides an electronic device. The electronic device can include a first housing including a first housing face, a display coupled to the first housing face, a second housing pivotably attached to the first housing the second housing including a second housing face, the second housing face being configured to cover a portion of the first housing face, a housing orientation detection module coupled to the second housing, the housing orientation detection module configured to detect a position of the second housing relative to the first housing, and a controller configured to display motion on the display based on the position detected by the housing orientation detection module. The second housing can be pivotably attached to the first housing along at least two axes of rotation. The orientation detection module can include at least one housing rotational motion sensor coupled to the first housing and the second housing. The housing rotational motion sensor can be an optical sensor, a shaft encoder, a roller sensor configured to track rotation of the second housing relative to the first housing, or any other sensor.

The electronic device can include a transceiver coupled to the second housing, and a telecommunications input coupled to the second housing. The electronic device can also include a shaft coupled to the first housing, a shaft encoder coupled to the shaft, a hinge connection rotatably coupled to the shaft and the second housing, and a second shaft encoder coupled to the hinge connection. The controller can select one of a gaming mode and a telecommunications mode, enable concurrent key entry in the gaming mode, and disable concurrent key entry in the telecommunications mode. The electronic device can additionally include a side tactile input coupled to the first housing on a surface perpendicular to the first housing face. The side tactile input can be a button, a dial, a sensor, a rocker switch, or any other input. The controller can enable a game action function such as a trigger function of the side tactile input in the gaming mode.

The controller can also control a display viewpoint on the display based on the housing orientation signal. The controller can further control an element on the display based on the housing orientation signal. The electronic device can also include a first housing tactile input coupled to the first housing. The controller can additionally control a first range of motion based on signals received from the display housing orientation detection module and a second range of motion based on signals received from the first housing tactile input.

According to another embodiment, the present invention provides a mobile communication device. The mobile communication device can include a display housing having a display housing face having a display housing face surface area and a display coupled to the display housing face. The mobile communication device can also include a main housing pivotably attached to the display housing along at least two axes of rotation, the main housing including a main housing face having a main housing face surface area, the main housing face surface area having approximately the same surface area as the display housing face surface area. The mobile communication device can additionally include a transceiver coupled to the main housing, a telecommunication device input coupled to the main housing. The telecommunication device input may be a microphone, a dual tone multiple frequency-style keypad, or any other telecommunication device input. The mobile communication device can further include a display housing orientation detection module coupled to the display housing, the display housing orientation detection module being configured to detect an orientation of the display housing relative to the main housing along the at least two axes of rotation and to generate a housing orientation signal. The mobile communication device can also include a controller configured to control motion on the display based on the housing orientation signal.

The mobile communication device can also include a tactile input coupled to the display housing. The controller can control a first range of motion based on signals received from the display housing orientation detection module and a second range of motion based on signals received from the tactile input. The display housing orientation detection module can include at least one housing rotational motion sensor coupled to the first housing and the second housing.

According to another embodiment, the present invention provides an electronic device. The electronic device can include a display housing having a display housing face having a display housing face surface area and a display coupled to the display housing face. The electronic device can also include a main housing pivotably attached to the display housing, the main housing including a main housing face having a main housing face surface area, the main housing face surface area being equal to at least half of the display housing face surface area. The electronic device can additionally include a sensor coupled to the display housing and to the main housing, the sensor configured to sense a positional relationship between the display housing and the main housing. The electronic device can further include a navigational input module coupled to the sensor, the navigational input module configured to generate navigational control signals based on the sensed positional relationship.

The electronic device can also include a tactile input coupled to the display housing and a controller configured to control a first range of motion based on signals received from the navigational input module and a second range of motion based on signals received from the tactile input. The tactile input can be a navigational speaker, buttons, or any other tactile input. The sensor can include at least one housing rotational motion sensor coupled to the first housing and the second housing.

According to another embodiment, the present invention provides a method for controlling a viewing angle in a mobile communication device including a mobile communication device display housing having a display, the mobile communication device display housing rotatably coupled to a mobile communication device main housing having a communication input. The method can include detecting a first position of the mobile communication device display housing relative to the mobile communication device main housing, displaying a viewpoint on the display, detecting a second position of the mobile communication device display housing relative to the mobile communication device main housing, and displaying motion on the display based on the detected second position.

The method can also include enabling mobile communication device display housing navigational control based on the detected first position. For example, when the housings are placed in a position useful for a gaming mode, the mobile communication device can enable navigational control using the display housing and the main display. The detected first position can be characterized by a longitudinal axis of the mobile communication device display housing being substantially perpendicular to a longitudinal axis of the mobile communication device main housing. For example, the detected first position can comprise the main housing in a joystick-style position relative to the display housing. The method can also include setting a display orientation based on the detected first position. For example, the display orientation can be a portrait mode for phone operation of the mobile communication device. Then, when the mobile communication device housings are placesplaced in a gaming position, the display orientation can be set to a landscape mode. The displaying motion step can include displaying a simulated strafing motion based on the detected second position. For example, the display can adjust a background sideways to simulate a strafing motion.

The displaying motion step can also include displaying a change in a simulated first person viewpoint based on the detected second position. For example, a viewing angle can be adjusted up and down or side to side. The method can also include selecting a gaming mode and enabling concurrent key entry in the gaming mode. The method can additionally include selecting a telecommunications mode and disabling concurrent key entry in the telecommunications mode.

Thus, among other benefits, the present invention provides an electronic device with improved tactile input functionality. For example, the present invention provides for multiple independent ranges of motion. The display housing can be used to control a viewing angle on the display such a looking up and down. Additionally, the display housing can be used for controlling forward and backward movement. Also, the main housing can be used to control sideways viewing directions on the display such as looking left and right. Furthermore, the main housing can be used for forward and backward movement. Additionally, buttons or keys located on the display housing or elsewhere can be used for simultaneous movement along with the housing controls. For example, in a game, buttons on the display housing can be used for forward, backward and turning around motions while the housings can be used to control viewing angles. More particularly, rotating the display housing towards a user can cause a game character to look up while rotating the display housing away from a user can cause a game character to look down. Also, moving the base housing to the right can cause a game character to strafe to the right and moving the base housing to the left can cause a game character to strafe to the left. Furthermore, moving the base housing side to side can cause an on-screen character to move left and right.

Additionally, the present invention provides an input device for improved movement control in a small electronic device. Furthermore, the present invention provides advanced input functionality for advanced gaming on portable electronic devices. These and further benefits will become more apparent with reference to the Figures and the descriptions of the preferred embodiments below.

FIG. 1 is an exemplary illustration of an electronic device 100 according to a first embodiment. The electronic device 100 may be a mobile communication device, an electronic gaming device, a personal digital assistant, or any other electronic device. The electronic device 100 can include a display housing 110 having a display housing face 115, a display 120 on the display housing face 115, and a main housing 130 having a main housing face 135. The display housing 110 can be coupled to the main housing 130 at a pivot point 180. For example, the display housing 110 can be pivotably attached to the main housing 130 using a shaft and hinge, using a ball and socket, or using any other connection for pivotal attachment. Thus, the display housing 110 can rotate about at least two axes of rotation with respect to the main housing 130.

The pivot point 180 can include internal sensors for detecting movement of the display housing 110 relative to the main housing 130. For example, the pivot point 180 can include at least one housing rotational motion sensor such as an optical sensor, a shaft encoder, a roller sensor configured to track rotation of the display housing 110 relative to the main housing 130, or any other sensor. Additionally, the main housing face 135 may be configured to cover at least a portion of the display housing face 115. Thus, the display housing face 115 may be configured to cover a portion of the main housing face 135. Also, the main housing face 135 surface area may be equal to at least one half, one third, or even one quarter of the display housing face 115 surface area. The display housing face 115 surface area may also be equal to at least one half, one third, or one quarter of the main housing face 135 surface area. Thus, the display housing 110 can pivot to cover at least a portion of the main housing face 135 in a closed position or vice versa. Preferably, the display housing face 115 has substantially the same surface area as the main housing face 135. Thus, the display housing 110 can pivot to cover the main housing face 135 in a closed position.

The electronic device 100 may also include a tactile input 140, such as a keypad, and an audio input 170, such as a microphone, on the main housing 130. The tactile input 140 and the audio input 170 can be telecommunication inputs for mobile communication purposes. The electronic device 100 may additionally include an input and output device 150 on the display housing. The input and output device 150 may be a speaker, buttons, a navigational speaker, or any other device for performing input and output functions. The electronic device 100 may further include additional tactile inputs 161 and 162 such as buttons, rocker switches, dials, or any other tactile inputs.

In operation, the display housing 110 can pivot with respect to the main housing 130 at the pivot point 180. Sensors at the pivot point 180 can detect a position of the main housing 130 relative to the display housing 110. For example, the sensors at the pivot point 180 can detect motion of the display housing 110. The electronic device 100 can then display motion on the display 120 based on the detected position. Thus, movement of the display housing 110 relative to the main housing 130 can be used to control movement on the display 120. The detected position can be used in games to control movement of characters and game elements on the display 120. The detected position can also be used to control a first person viewpoint on the display 120. The detected position can additionally be used in electronic device applications to control a cursor or mouse on the display 120. Thus, the detected position can be used to control any movement on the display 120. Signals can be transmitted between the main housing 130 and the display housing 110 using contact points in the pivot point 180, using radio frequency signals, using optical signals, using wires, or using any other means for transmitting signals.

Figure 2:
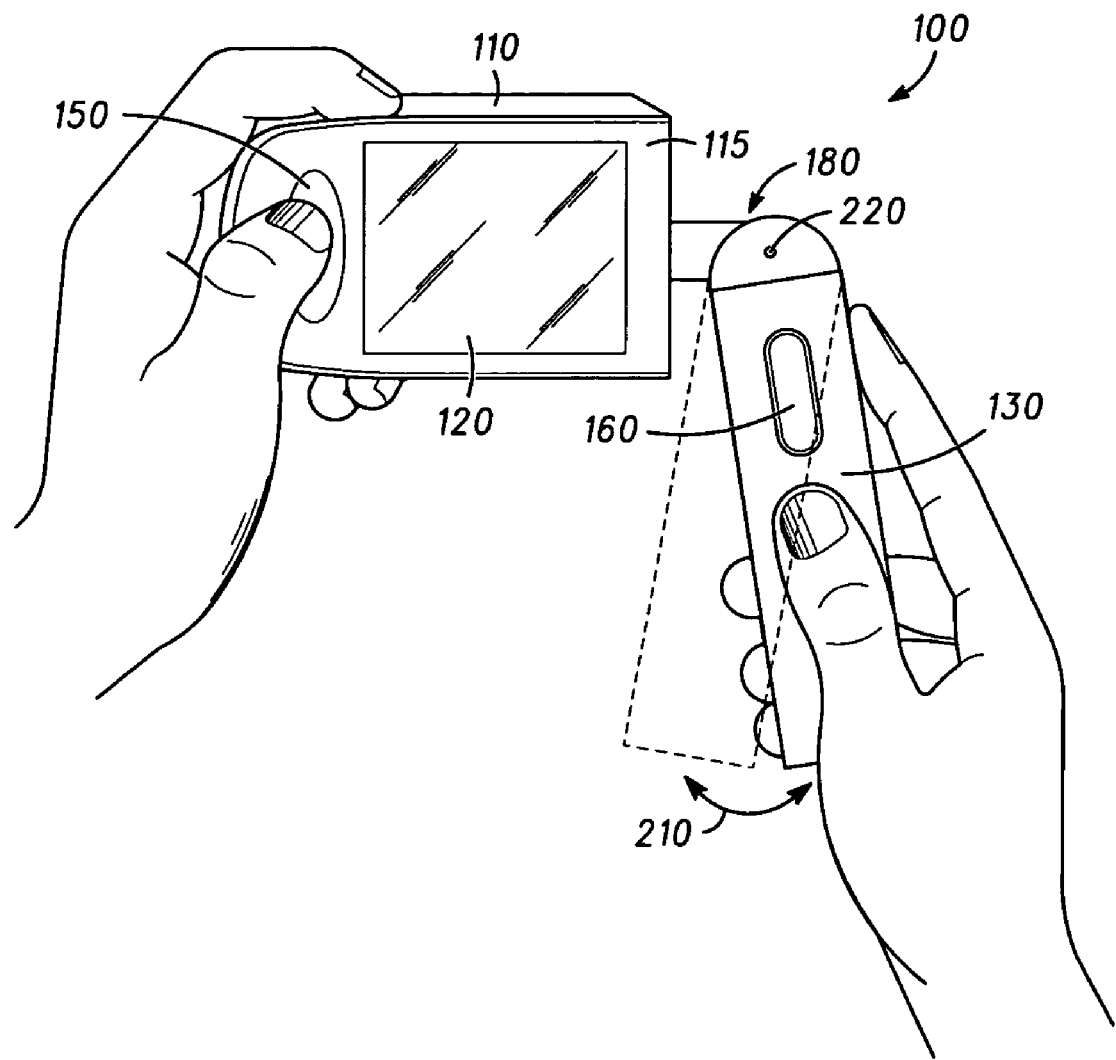
FIG. 2 is an exemplary illustration of a side view of the electronic device.

FIG. 2 is an exemplary illustration of a side view of the electronic device 100. As shown, the main housing 130 can pivot along an arc 210 on a first axis of rotation 220. Thus, the main housing 130 can be rotated back and forth to control movement on the display 120. For example, moving the main housing 130 to the left and right can control a simulated strafing motion of a first person viewpoint on the display 130. This strafing motion can be shown by panning a viewpoint on the display 130 left and right. Moving the main housing 130 back and forth relative to the display housing 110 can also control a left and right movement of an element on the display 120. Moving the main housing 130 can also control any other functions on the display 120. Moving the main housing 130 relative to the display housing 110 is equivalent to moving the display housing 110 relative to the main housing 130. Thus, moving the main housing 130 to different positions relative to the display housing 110 can be used to display motion on the display 120.

Figure 3:
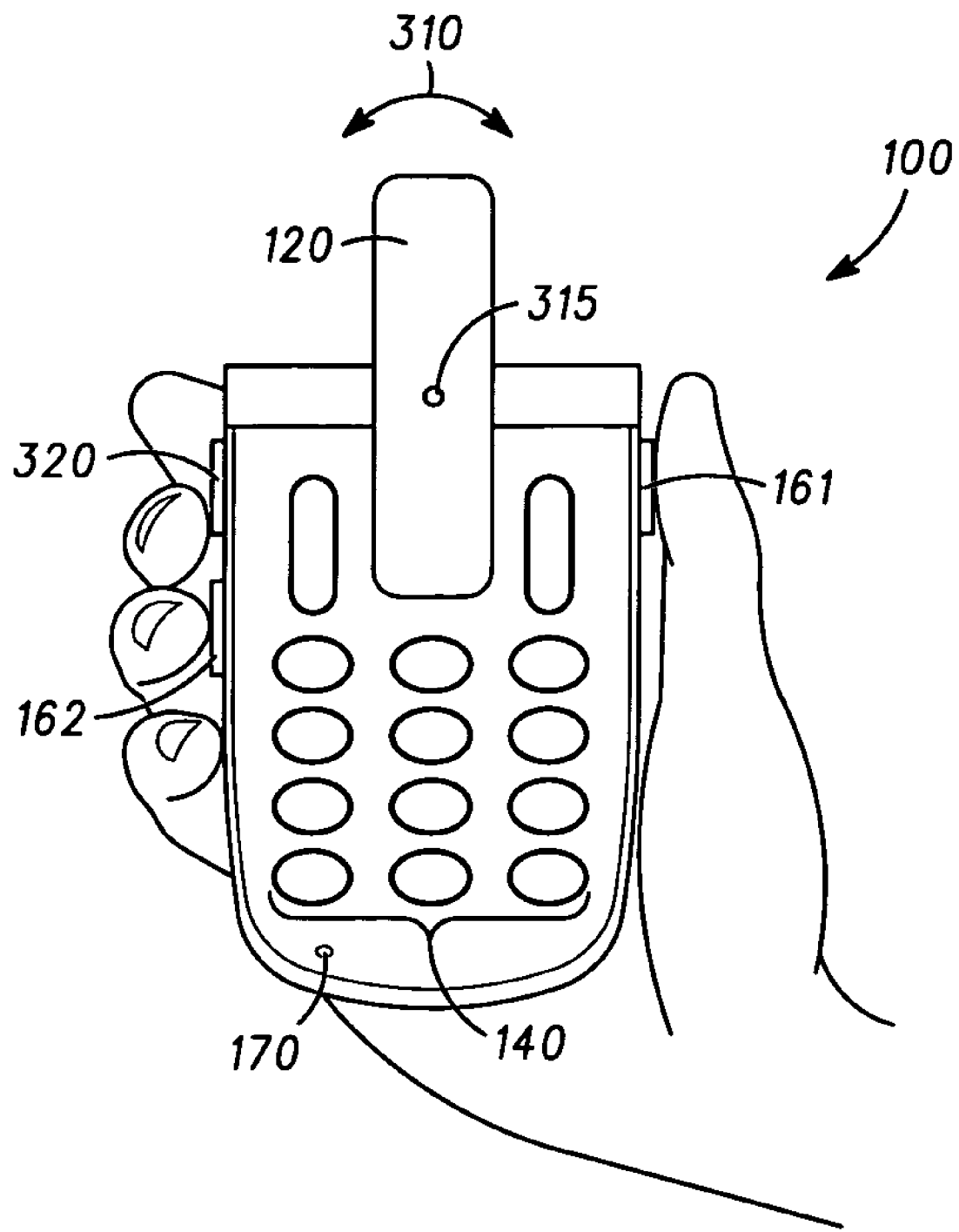
FIG. 3 is an exemplary illustration of a second side view of the electronic device.

FIG. 3 is an exemplary illustration of a second side view of the electronic device 100. As shown, the display housing 130 can pivot along arc 310 on a first axis of rotation 315. Thus, the display housing 110 can be rotated back and forth to control movement on the display 120. For example, turning the top of the display housing 110 to and from a user can control a simulated up and down viewpoint of a first person viewpoint on the display 120. This up and down can be shown by adjusting a vertical viewpoint on the display 120 perspectively up and down. Moving the display housing 110 can also control any other functions on the display 120. Again, moving the display housing 110 relative to the main housing 130 is equivalent to moving the main housing 130 relative to the display housing 110. Thus, moving the display housing 110 to different positions relative to the main housing 130 can be used to control the display of motion on the display 120.

As also shown, the electronic device 110 can include tactile input 320 along with tactile inputs 161 and 162. The tactile input 320 can be a button, a rocker switch, a dial, or any other tactile input. All inputs of the electronic device 100 can be controlled or remapped depending on the mode of operation of the electronic device 100. For example, when the electronic device 100 is in a gaming mode of operation, the tactile input 320 can be remapped to perform a game action function such as a trigger function. Thus, the main housing 130 can emulate a hand held device employing a trigger when the electronic device 100 is in a certain gaming mode. As another example, when the electronic device 100 is in a telecommunication mode of operation, the tactile input 320 can be remapped to perform a volume control function. Accordingly, all inputs can be remapped to perform useful functions depending on the mode of operation of the electronic device 100.

Figure 4:
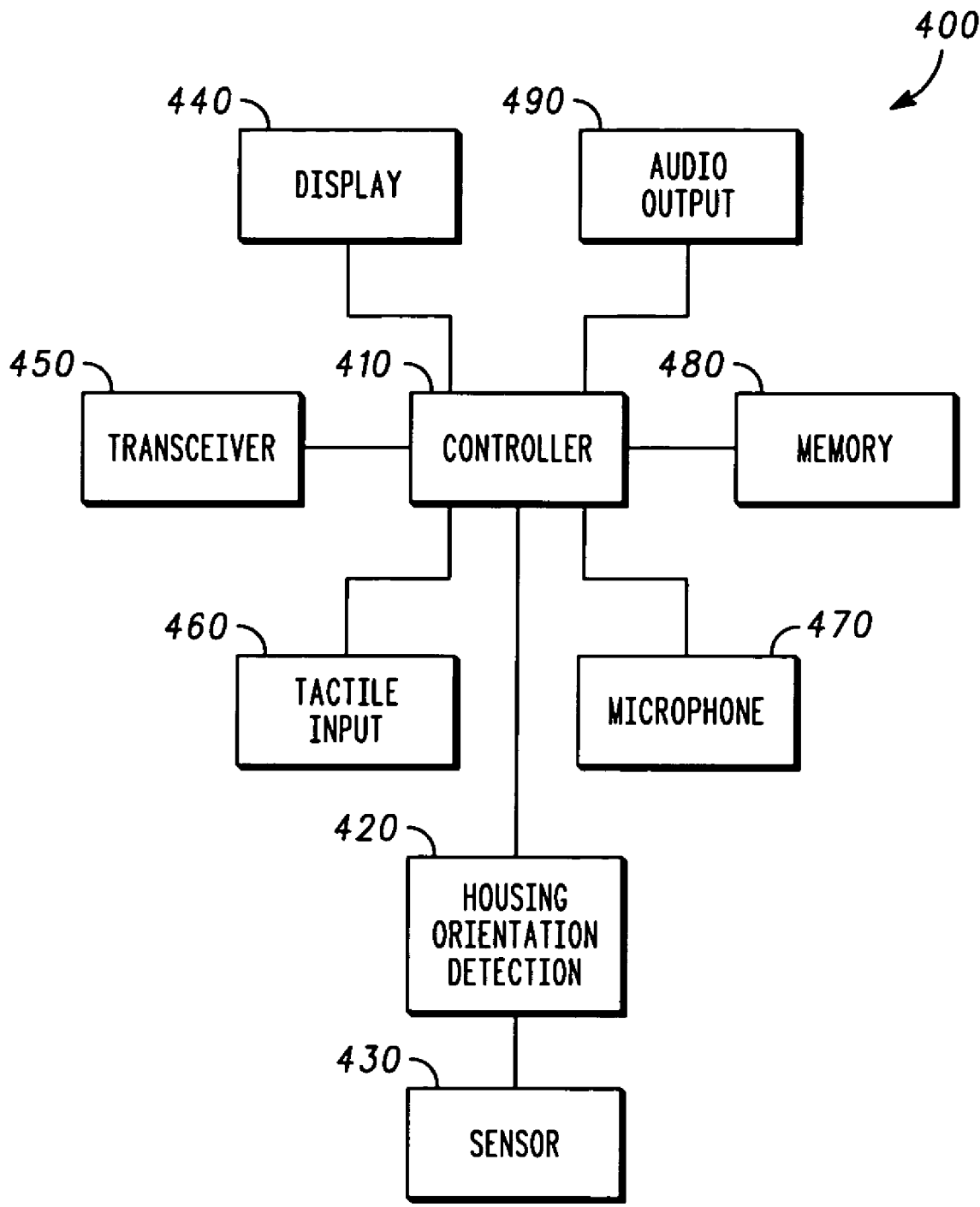
FIG. 4 is an exemplary block diagram of an electronic device according to a second embodiment.

FIG. 4 is an exemplary block diagram of an electronic device 400 according to a second embodiment. The electronic device 400 can include a controller 410, a housing orientation detection module 420, and at least one sensor 430. The electronic device 400 may also include a display 440, a transceiver 450, a tactile input 460, a microphone 470, a memory 480, and an audio output 490. The transceiver 450 may be a transmitter and/or a receiver. Also, the transceiver 450 may reside in the main housing 130. The tactile input 460 may include a telecommunications input, a keypad, buttons, pressure sensors, dials, or any other tactile inputs. The display 440 may be a liquid crystal display, a light emitting diode display, a plasma display, or any other display useful for displaying visual information. The audio output 490 may be a speaker, a transducer, or any other device useful for providing audio output. The memory 480 may be a random access memory, a read only memory, an optical memory, a magnetic memory, or any other memory useful for storing program codes and/or data. The housing orientation detection module 420 may reside in the controller 410. Also, different elements of the electronic device 400 may reside within different elements of the electronic device 100. Also, the housing orientation detection module 420 may include the sensor 430. The sensor 430 can include at least one housing rotational motion sensor such as an optical sensor, a shaft encoder, a roller sensor configured to track rotation of the display housing 110 relative to the main housing 130, or any other sensor.

In operation, the housing orientation detection module 420 can detect a position of the main housing 130 relative to the display housing 110 using the sensor 430. The controller 410 can then display motion on the display 440 based on the position detected by the housing orientation detection module 420. The controller 410 can also select one of a gaming mode and a telecommunications mode, enable concurrent key entry in the gaming mode, and disable concurrent key entry in the telecommunications mode. For example, only single keys presses on a keypad are necessary in a telecommunications mode such as a phone mode. However, simultaneous key presses are useful in other applications such as games for performing action functions while controlling movement. Thus, the controller 410 can enable concurrent key entry in the gaming mode and disable concurrent key entry in the telecommunications mode.

The controller 410 can also enable a trigger function of the tactile input 460 such as the side tactile input 320. The controller 410 can additionally control a display viewpoint based on a housing orientation signal. The controller 410 can further control an element on the display 440 based on the housing orientation signal. The controller 410 can further control a first range of motion based on signals received from the display housing orientation detection module 420 and a second range of motion based on signals received from the tactile input 460. The housing orientation detection module 420 can also generate navigational control signals based on signals received from the sensor 430. For example, the housing orientation detection module 420 can generate signals for controlling the movement of elements on the display 440.

According to another embodiment, the controller 410 can execute control functions in the electronic device 400. For example, the controller 410 can control a viewing angle on the display 440 of the electronic device 400. The controller 410 can execute control functions by detecting a first position of the mobile communication device display housing 110 relative to the mobile communication device main housing 130, displaying a viewpoint on the display 440, detecting a second position of the mobile communication device display housing 110 relative to the mobile communication device main housing 130, and displaying motion on the display 440 based on the detected second position.

The controller 410 can also execute control functions by enabling mobile communication device display housing navigational control based on the detected first position. For example, when the housings 110 and 130 are placed in a position useful for a gaming mode, the controller 410 can enable display housing navigational control. The detected first position can be characterized by a longitudinal axis of the mobile communication device display housing 110 being substantially perpendicular to a longitudinal axis of the mobile communication device main housing 130 as illustrated in FIG. 1. For example, the detected first position can have the main housing 130 in a joystick-style position relative to the display housing 110.

The controller 410 can further execute control functions by setting a display orientation based on the detected first position. For example, the display orientation can be a portrait mode for phone operation of the mobile communication device. Then, when the mobile communication device housings 110 and 130 are placed in a gaming position, the display orientation can be set to a landscape mode. Displaying motion can include displaying a simulated strafing motion based on the detected second position. For example, the display 440 can adjust a background in a sideways motion to simulate a strafing motion. Displaying motion can also include displaying a change in a simulated first person viewpoint based on the detected second position. For example, a viewing angle can be adjusted up and down or side to side.

The controller 410 can additionally execute control functions by selecting a gaming mode and enabling concurrent key entry in the gaming mode. The controller 410 can also execute control functions by selecting a telecommunications mode and disabling concurrent key entry in the telecommunications mode.

Figure 5:
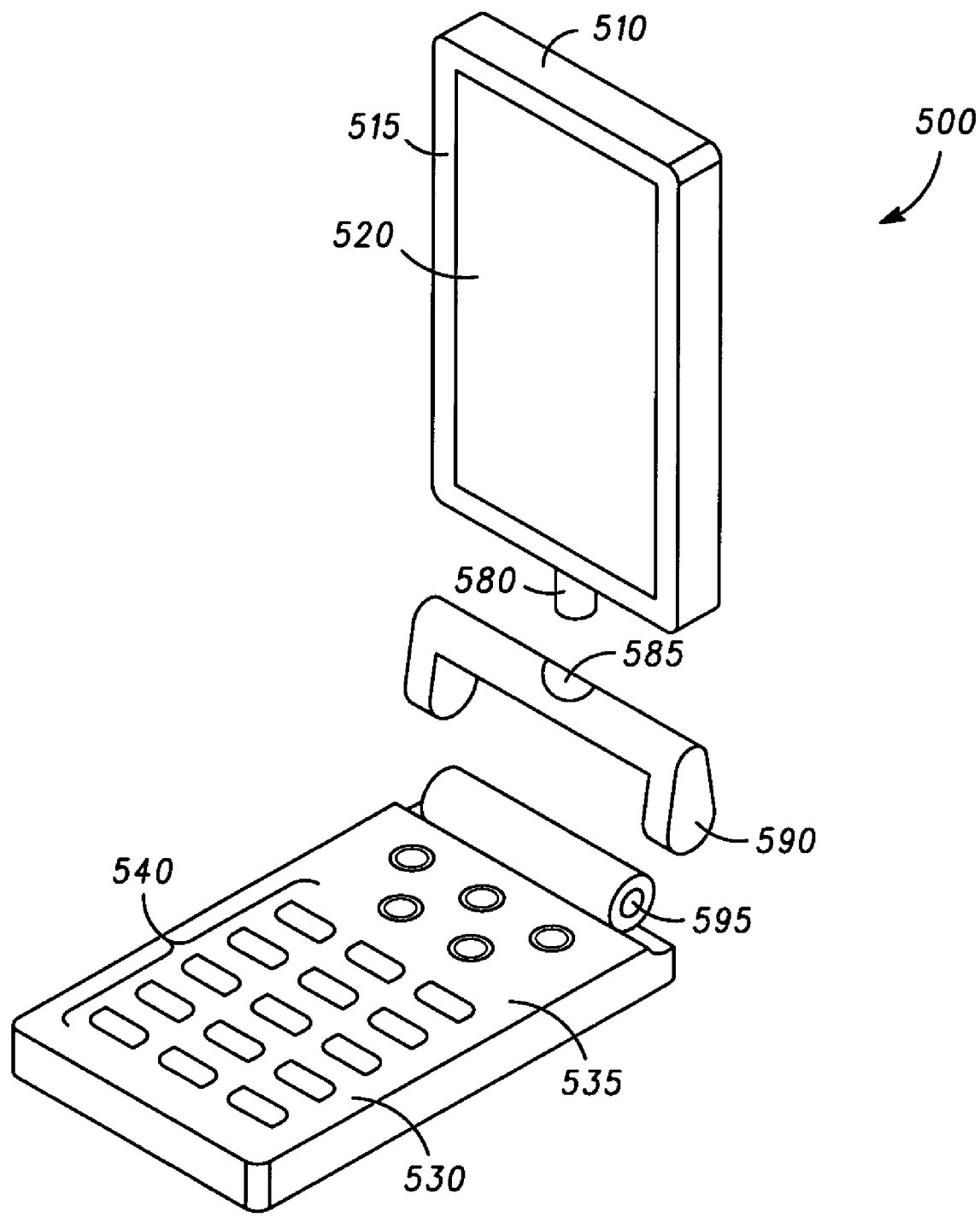
FIG. 5 is an exemplary illustration of a electronic device according to a third embodiment.

FIG. 5 is an exemplary illustration of a electronic device 500 according to a third embodiment. The electronic device 500 may be a mobile communication device, a personal digital assistant, or any other portable electronic device. The electronic device 500 can include a display housing 510, a display housing face 515, a display 520, a main housing 530, a main housing face 535, a tactile input 540 such as a keypad or buttons, a shaft 580, a first sensor 585 such as a shaft encoder, a hinge connection 590, and a second sensor such as a shaft encoder 595. The display housing 510 is coupled to the shaft 580 and the first sensor 585. Thus, the first sensor 585 can detect rotation of the display housing 510 along a first axis of rotation. The main housing 530 is coupled to the second sensor 595 and the hinge 590. Thus, the second sensor 595 can detect rotation of the base housing 530 along a second axis of rotation. Therefore, the first sensor 585 and the second sensor 595 can detect movement of the display housing 510 relative to the main housing 530 along at least two axes of rotation. Furthermore, the electronic device 500 may also include other functions and features found in the electronic device 100.

Figure 6:
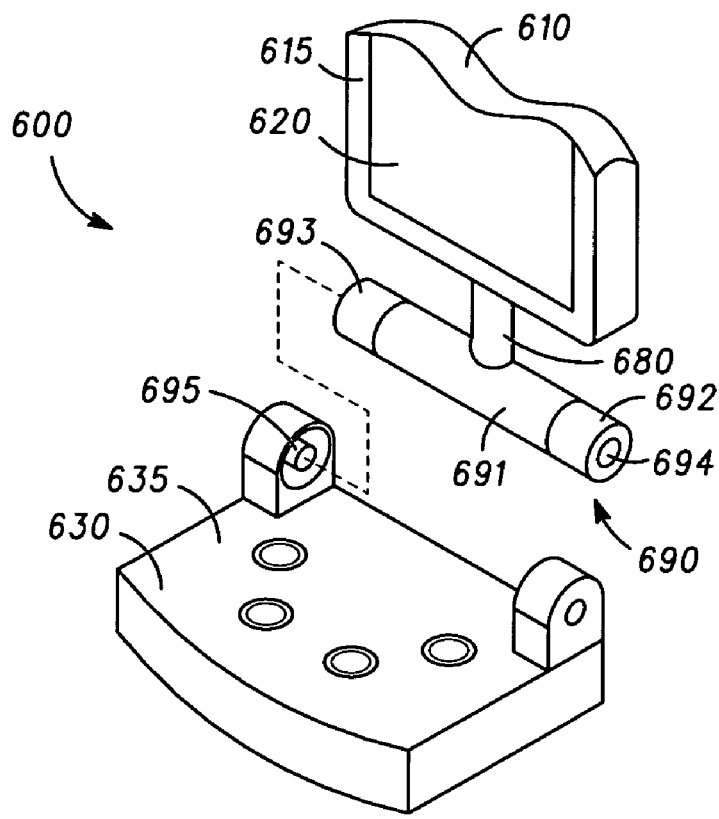
FIG. 6 is an exemplary illustration of a portion of an electronic device according to a fourth embodiment.

FIG. 6 is an exemplary illustration of a portion of an electronic device 600 according to a fourth embodiment. The electronic device 600 may be a mobile communication device, a personal digital assistant, or any other portable electronic device. The electronic device 600 can include a display housing 610, a display housing face 615, a display 620, a main housing 630, a main housing face 635, a shaft 680, a hinge connection 690, and a first sensor such as a shaft encoder 695. The main housing 630 can be coupled to the first sensor 695 and the hinge connection 690. The hinge connection 690 can include a first hinge portion 691 and second hinge portions 692 and 693, and a hinge axis of rotation 694. In operation, the first hinge portion 691 can rotate about the hinge axis of rotation 694 and the first sensor 695 can detect the movement. The second hinge portions can remain stationary with respect to the main housing 630.

A second sensor can be located within the hinge connection 690 or the display housing 610 and the display housing 610 can be coupled to the shaft 680 and the second sensor. Thus, the second sensor can detect rotation of the display housing 610 along an axis of rotation coincident with the shaft 680. Therefore, the first sensor 695 and the second sensor can detect movement of the display housing 610 relative to the main housing 630 along at least two axes of rotation. Furthermore, the electronic device 600 may also include other functions and features found in the electronic device 100.

Figure 7:
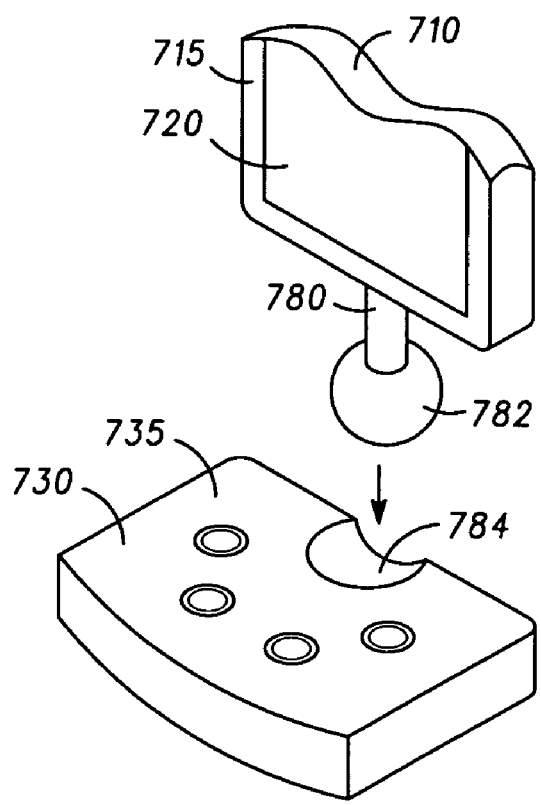
FIG. 7 is an exemplary illustration of a portion of an electronic device according to a fifth embodiment.

FIG. 7 is an exemplary illustration of a portion of an electronic device 700 according to a fifth embodiment. The electronic device 700 can include a display housing 710, a display housing face 715, a display 720, a main housing 730, a main housing face 735, a shaft 780, and a ball 782 and socket 784 connection. At least one sensor can be located within the socket 784. The display housing 710 can be coupled to the main housing 730 via the ball 782 and socket 784 connection. The ball 782 and socket 784 connection can provide for movement of the display housing 710 relative to the main housing 730 along at least two axes of rotation. The sensor located within the socket 784 can detect the movement of the display housing 710 relative to the main housing 730. Furthermore, the electronic device 700 may also include other functions and features found in the electronic device 100.

Figure 8:
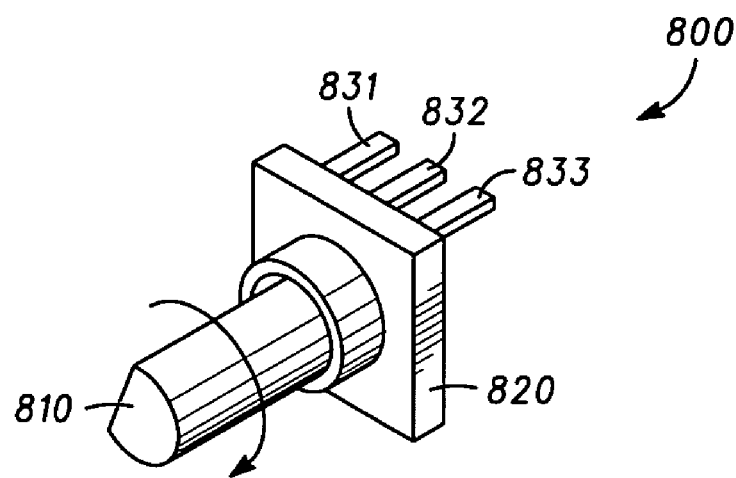
FIG. 8 is an exemplary illustration of a sensor according to a first embodiment.

FIG. 8 is an exemplary illustration of a sensor 800 according to a first embodiment. The sensor 800 can be a shaft encoder. The sensor 800 can include a shaft 810, a base 820, common terminal 831 and output terminals 832 and 833. In operation, when rotated, the shaft 810 can connect and disconnect the output terminals 832 and 833 with the common terminal 831. Based on the sequence of connection and disconnection, the amount and direction of rotation can be determined from signals at the terminals 831-833.

Figure 9:
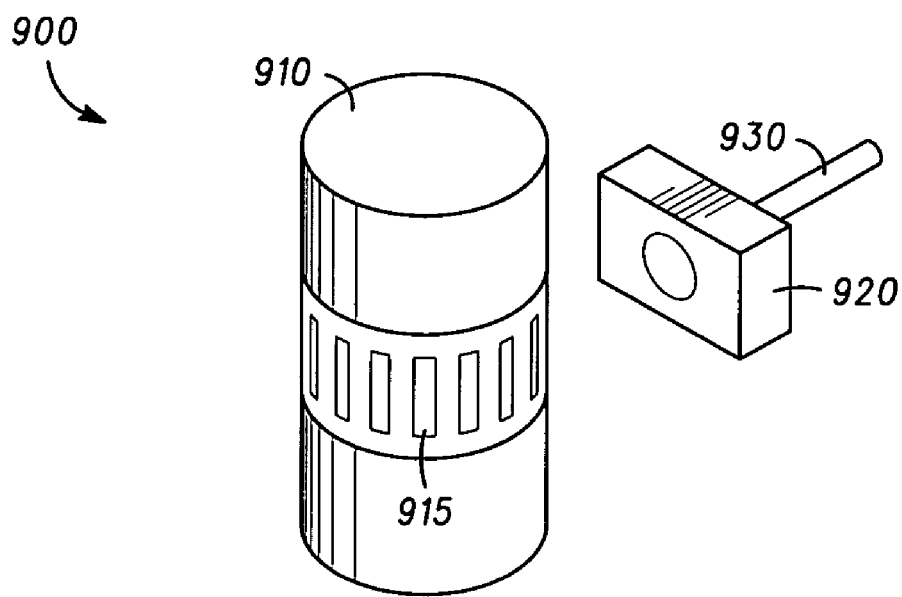
FIG. 9 is an exemplary illustration of a sensor according to a second embodiment.

FIG. 9 is an exemplary illustration of a sensor 900 according to a second embodiment. The sensor 900 may be an optical encoder. The sensor 900 can include a shaft 910, shaft markings 915, an optical sensor 920, and an output 930. In operation, when the shaft 910 is rotated, the optical sensor 920 can detect movement of the markings 915. Based on the movement and type of markings 915 detected, the optical sensor 920 can output signals at the output 930 indicating direction and amount of movement.

Figure 10:
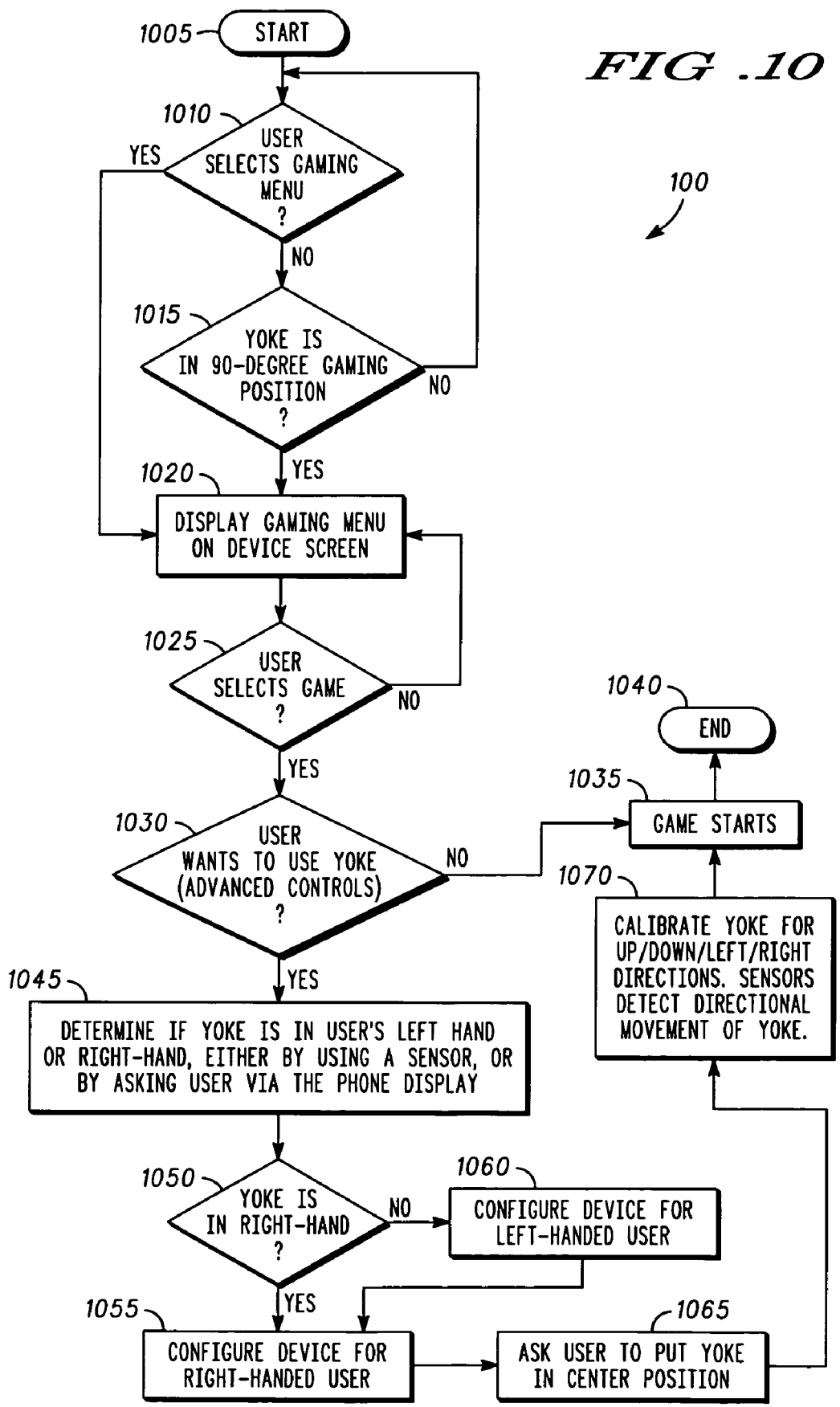
FIG. 10 is an exemplary flowchart outlining the operation of a controller according to a preferred embodiment.

FIG. 10 is an exemplary flowchart 1000 outlining the operation of the controller 410 according to a preferred embodiment. In step 1005, the flowchart begins. In step 1010, the controller 410 determines if the user selected a gaming menu. If not, in step 1015, the controller 410 determines if the main housing 130, such as a gaming yoke or joystick, is in a position substantially perpendicular to the display housing 110. In step 1015, the controller 410 may alternately determine if the main housing 130 is at any position indicating a gaming or navigational control position. For example, the main housing 130 may be at a user-defined angle, a gaming mode resting spot, or any other position indicating a gaming mode or navigational control mode. If not, the controller 410 returns to step 1010. If either a gaming menu is selected of the main housing 130 is in a position substantially perpendicular to the display housing 110, the controller 410 displays a gaming menu on the display 120 in step 1020. In step 1025, the controller 410 determines if the user has selected a game. If not, the controller 410 returns to step 1020. If the user has selected a game, in step 1030, the controller 410 determines if the user wants to use the main housing 130 as a gaming yoke. If not, the controller 410 starts the game in step 1035 and the flowchart 1000 ends in step 1040. If the controller 410 determines the user wants to use the main housing 130 as a gaming yoke, the controller advances to step 1045. In step 1045, the controller 410 senses a left or right-handed position of the main housing 130 by using a sensor such as a gravity sensor, by querying the user, or by detection of specific key or button presses, or by any other method. In step 1050, the controller 410 determines if the main housing 130 is in the user's right hand. If so, in step 1055, the controller 410 remaps the electronic device 100 inputs and outputs for a right-handed user. For example the controller 410 can select specific buttons to perform a trigger function and can select a display 120 orientation to be optimal for a right-handed user. If the main housing 130 is not in the user's right hand, in step 1060, the controller 410 configures the electronic device 100 for a left-handed user. For example the controller 410 can select specific buttons to perform a trigger function and can select a display 120 orientation to be optimal for a left-handed user. In step 1065, the controller 410 asks the user to put the main housing 130 in the center position. The controller 410 can make this query via audible or visual output. In step 1070, the controller 410 calibrates the main housing 130 and any necessary sensors and performs preliminary setup for proper control by using the necessary sensors. In step 1035, the game starts. In step 1040, the flowchart ends.

The method of this invention is preferably implemented on a programmed processor. However, the controller 410 and other elements of the disclosed electronic devices may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. An electronic device, comprising:
    a first housing including a first housing face;
    a display coupled to the first housing face;
    a second housing pivotably attached to the first housing the second housing including a second housing face, the second housing face being configured to cover at least a portion of the first housing face;
    a housing orientation detection module coupled to the second housing, the housing orientation detection module configured to detect a position of the second housing relative to the first housing; and a controller configured to display motion on the display based on the position detected by the housing orientation detection module, wherein the motion on the display is caused by a change in the position detected by the housing orientation detection module, wherein motion comprises movement of an element within an image displayed on the display.

2. The electronic device according to claim 1, wherein the second housing is pivotably attached to the first housing along at least two axes of rotation.

3. The electronic device according to claim 1, wherein the orientation detection module includes at least one housing rotational motion sensor coupled to the first housing and the second housing.

4. The electronic device according to claim 3, wherein the housing rotational motion sensor comprises an optical sensor.

5. The electronic device according to claim 3, wherein the housing rotational motion sensor comprises a shaft encoder.

6. The electronic device according to claim 3, wherein the housing rotational motion sensor comprises a roller sensor configured to track rotation of the second housing relative to the first housing.

7. The electronic device according to claim 1, further comprising:

a transceiver coupled to the second housing; and a telecommunications input coupled to the second housing.

8. The electronic device according to claim 1, further comprising:

a shaft coupled to the first housing;

a shaft encoder coupled to the shaft;

a hinge connection rotatably coupled to the shaft and the second housing; and a second shaft encoder coupled to the hinge connection.

9. The electronic device according to claim 1, wherein the controller is further configured to select one of a gaming mode and a telecommunications mode, enable concurrent key entry in the gaming mode, and disable concurrent key entry in the telecommunications mode.

10. The electronic device according to claim 1, further comprising:

a side tactile input coupled to the first housing on a surface perpendicular to the first housing face, wherein the controller is further configured to enable a game action function of the side tactile input in the gaming mode.

11. The electronic device according to claim 1, wherein the controller controls a display viewpoint based on the housing orientation signal.

12. The electronic device according to claim 1, wherein the controller controls an element on the display based on the housing orientation signal.

13. The electronic device according to claim 1, further comprising:

a first housing tactile input coupled to the first housing, wherein the controller is further configured to control a first range of motion based on signals received from the display housing orientation detection module and a second range of motion based on signals received from the first housing tactile input.

14. An electronic device, comprising:

a first housing including a first housing face;

a display coupled to the first housing face;

a second housing pivotably attached to the first housing the second housing including a second housing face, a first housing face surface area being equal to at least half of a second housing face surface area;

a housing orientation detection module coupled to the second housing, the housing orientation detection module configured to detect a position of the second housing relative to the first housing; and a controller configured to display motion on the display caused by and corresponding to movement of the second housing relative to the first housing based on the position detected by the housing orientation detection module, wherein motion comprises movement of an element within an image displayed on the display.

15. The electronic device according to claim 14, wherein the second housing is pivotably attached to the first housing along at least two axes of rotation.

16. The electronic device according to claim 14, wherein the orientation detection module includes at least one housing rotational motion sensor coupled to the first housing and the second housing.

17. An electronic device, comprising:

a first housing including a first housing face;

a display coupled to the first housing face;

a second housing pivotably attached to the first housing the second housing including a second housing face, the second housing face being configured to cover at least a portion of the first housing face;

a housing orientation detection module coupled to the second housing, the housing orientation detection module configured to detect a position of the second housing relative to the first housing; and a controller configured to display motion on the display, the motion caused by a change in the position of the second housing relative to the first housing detected by the housing orientation detection module, wherein motion comprises movement of an element within an image displayed on the display.

18. The electronic device according to claim 17, wherein the second housing is pivotably attached to the first housing along at least two axes of rotation.

19. The electronic device according to claim 17, wherein the orientation detection module includes at least one housing rotational motion sensor coupled to the first housing and the second housing.

20. The electronic device according to claim 17, wherein the change in the position of the second housing relative to the first housing controls the motion on the display.

21. The electronic device according to claim 17, wherein motion comprises at least one of movement of a character on the display and scrolling of the display.

* * * * *